US006896326B2

United States Patent
Chen

(12) United States Patent
(10) Patent No.: US 6,896,326 B2
(45) Date of Patent: May 24, 2005

(54) REST APPARATUS FOR INFANTS WITH BACKREST AND HEADREST COOPERATION MECHANISM

(75) Inventor: Shun-Min Chen, Taipei Hsien (TW)

(73) Assignee: Wonderland Nurserygoods Co., Ltd (JP)

(*) Notice: Subject to any disclaimer, the term of this patent is extended or adjusted under 35 U.S.C. 154(b) by 0 days.

(21) Appl. No.: 10/422,159

(22) Filed: Apr. 24, 2003

(65) Prior Publication Data

US 2004/0212225 A1 Oct. 28, 2004

(51) Int. Cl.[7] ............................................. A47D 1/00
(52) U.S. Cl. ................. 297/256.13; 297/61; 297/256.1; 297/354.1; 297/354.12
(58) Field of Search ................. 297/61, 135, 250.1, 297/256.1, 256.13, 354.1, 354.12, 354.13

(56) References Cited

U.S. PATENT DOCUMENTS

| | | | | |
|---|---|---|---|---|
| 294,286 A | * | 2/1884 | Stiles ......................... 297/256 |
| 4,805,928 A | | 2/1989 | Nakao et al. | |
| 5,195,770 A | * | 3/1993 | Ishikura ....................... 280/648 |
| 5,520,435 A | * | 5/1996 | Fujimoto et al. ............... 297/61 |
| 5,752,738 A | * | 5/1998 | Onishi et al. .................. 297/61 |
| 5,823,619 A | * | 10/1998 | Heilig et al. ............ 297/216.12 |
| 6,070,935 A | * | 6/2000 | Heimann et al. .............. 297/68 |
| 6,192,565 B1 | * | 2/2001 | Tame .......................... 297/61 |
| 6,209,154 B1 | * | 4/2001 | Huang ........................ 5/37.1 |
| 6,247,753 B1 | * | 6/2001 | Alvestad ................. 297/362.13 |
| 6,679,556 B1 | * | 1/2004 | Alvestad ................. 297/354.13 |
| 6,715,827 B1 | * | 4/2004 | Chen .......................... 297/148 |

FOREIGN PATENT DOCUMENTS

| | | |
|---|---|---|
| EP | 0198802 | 10/1986 |
| EP | 0467650 | 3/1992 |
| EP | 0719684 | 12/1994 |

* cited by examiner

Primary Examiner—Peter M. Cuomo
Assistant Examiner—Joseph Edell
(74) Attorney, Agent, or Firm—Gauthier & Connors LLP

(57) ABSTRACT

A rest apparatus for infants with backrest and headrest cooperation mechanism comprises a seat frame, a backrest, a headrest and a cooperation mechanism. The cooperation mechanism includes a first rod, a second rod, a third rod, and an elastic element connected to near the joint of the first rod and the second rod, all of which are pivotally connected in sequence. When the angle between the backrest and the seat frame is adapted for sitting or reclining, the seat frame does not exert any force to the first rod so that the head rest will not be cooperated by the cooperation mechanism and can align with the backrest to prevent the neck of the infants, toddlers or small children from being improperly bent. While the angle between the backrest and the seat frame is adapted for lying, the seat frame exerts a force to the first rod and cooperates the headrest such that the angle between the headrest and the backrest is reduced and the headrest becomes an obstacle at the end of the backrest to prevent the infants, toddlers or small children from dropping out of the end of the backrest.

6 Claims, 5 Drawing Sheets

US 6,896,326 B2

REST APPARATUS FOR INFANTS WITH BACKREST AND HEADREST COOPERATION MECHANISM

FIELD OF THE INVENTION

The present invention relates generally to a rest apparatus for infants with backrest and headrest cooperation mechanism, and more particularly to a rest apparatus whose headrest can be cooperated and adjusted the inclination angle relative to the backrest only after the backrest is pivotally rotated to a particular inclination angle relative to the seat frame.

BACKGROUND OF THE INVENTION

The conventional stroller or high chair for infants, toddlers and small children mainly has a seat frame, a backrest, a supporting frame, and a plurality of wheels pivotally connected with each other. The conventional stroller or high chair without a headrest, when it is adjusted to the position for lying, will put the infant, toddler and small child therein in a danger of dropping from the top of the backrest when they are turning over or playing because of no headrest for protecting their heads.

As FIG. 1 shown, in viewing of the danger of dropping, in addition to having a seat frame 1, a backrest 2, a supporting frame 5 and a plurality of wheels 6, as shown in FIG. 2, the conventional stroller or high chair 9 for infants, toddlers and small children further has a headrest 3 pivotally connected at the top of the backrest 2 such that, when the stroller or high chair 9 is adjusted and in the position for lying (as the dotted line shown in FIG. 2), the headrest 3 can be adjusted to about 90 degrees relative to the backrest so as to protect the infant, toddler and small child therein and prevent them from dropping.

However, besides the upright position shown as FIG. 1 and the lying position shown as the dotted line in FIG. 2, the above prior art still can be adjusted to a plurality of reclined positions shown as the solid line and the chain-dotted line in FIG. 2. During the reclined positions, the relative angle between the headrest 3 and the backrest 2 unceasingly changes according to the rotation of the backrest 2 relative to the seat frame 1. Therefore, the neck between the head and the back of the infant, toddler or small child reclining in the stroller or high chair is improperly bent, which not only does not comply with the principle in the ergonomics, but also hinder it from normally growing.

SUMMARY OF THE INVENTION

Accordingly, the present invention relates to a rest apparatus for infants with backrest and headrest cooperation mechanism that can substantially obviate one or more of the problems due to the limitations and disadvantages of the related arts.

One object of the present invention is the provision of a rest apparatus for infants with backrest and headrest cooperation mechanism whose headrest can be cooperated and inclination angle of the headrest relative to the backrest can be adjusted only when the backrest is at certain positions.

Another object of the present invention is the provision of a rest apparatus for infants with backrest and headrest cooperation mechanism, where the neck of the infant, toddler or small child therein will not be improperly bent.

Additional features and advantages of the invention will be set forth in the description which follows, and in part will be apparent from the description, or may be learned by practice of the invention. The objectives and advantages of the invention will be realized and attained by the structure particularly pointed out in the written description and claims hereof as well as the appended drawings.

To achieve these and other advantages and according to the purpose of the present invention, as embodied and broadly described, a rest apparatus for infants with backrest and headrest cooperation mechanism comprises a backrest, a seat frame pivotally connected to an end of the backrest, a headrest pivotally connected to another end of the backrest, and a cooperation mechanism. The cooperation mechanism includes a first rod, a second rod and a third rod. The first rod is connected with the backrest and has a first end and a second end opposite to the first end. The second rod has a third end, a fourth end opposite to the third end, and a pivot section between the third end and the forth end, wherein the third end is pivotally connected with the second end of the first rod and the pivot section is pivoted to the backrest. The third rod has a fifth end pivotally connected with the fourth end of the second rod, and a sixth end opposite to the fifth end pivotally connected with the headrest. While the seat frame, the backrest, and the headrest are relatively rotated, if the first rod moves relative to the backrest, the first rod cooperates the second and the third rods, and moreover changes the relative angle between the headrest and the backrest. On the other hand, if the first rod does not move relative to the backrest, the relative angle between the headrest and the backrest will remain unchanged.

It is preferred that the rest apparatus for infants with backrest and headrest cooperation mechanism further comprises an elastic element, an end of which is connected with the second end of the first rod in order to exert a force on the first rod toward the seat frame.

It is preferred that the backrest of the rest apparatus for infants with backrest and headrest cooperation mechanism has a slot for guiding the movement of the fourth endof the second rod.

It is preferred that the first rod of the rest apparatus for infants with backrest and headrest cooperation mechanism has a flute near the second end thereof.

It is preferred that the seat frame of the rest apparatus for infants with backrest and headrest cooperation mechanism has a shoulder. If the first end of the first rod does not contact the shoulder, the first rod does not cooperate the second and the third rods, and the relative angle between the headrest and the backrest will remain unchanged. On the other hand, if the first end of the first rod contacts the shoulder, the headrest and the backrest are cooperated and the relative angle is changed.

It is preferred that the backrest of the rest apparatus for infants with backrest and headrest cooperation mechanism has the cooperation mechanism at each of two sides.

Besides, the rest apparatus for infants with backrest and headrest cooperation mechanism according to the present invention can be advantageously connected to a supporting frame and a plurality of wheels so as to form a stroller.

It is to be understood that both the forgoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principle of the invention. In the drawings.

DETAILED DESCRIPTION OF THE INVENTION

Figure 4:
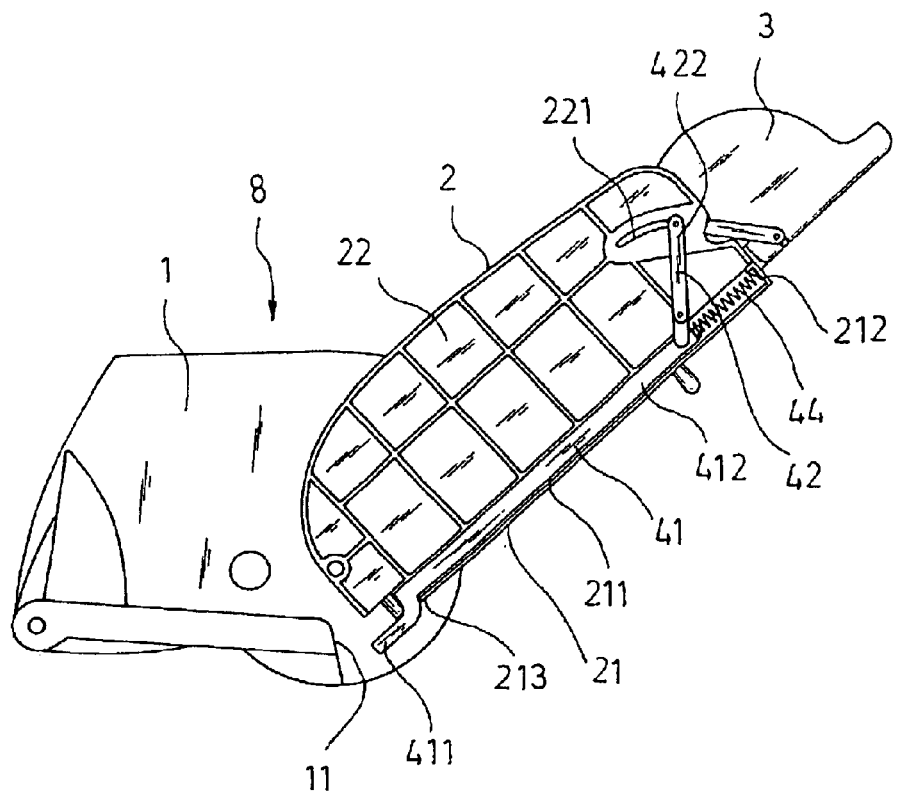
FIG. 4 is an assembled side view of the above-mentioned preferred embodiment illustrating the backrest in the reclining state.
Figure 6:
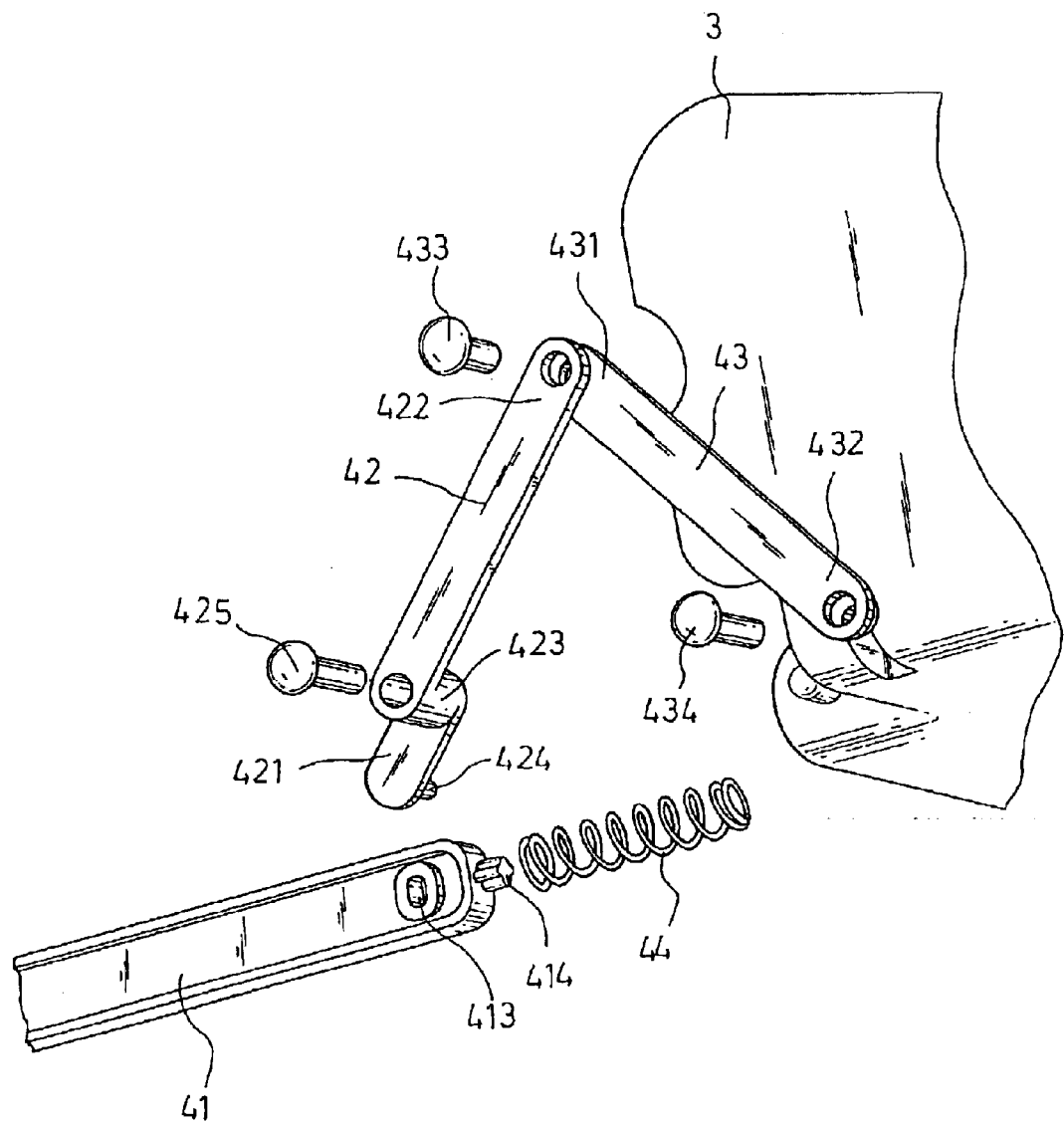
FIG. 6 is an exploded perspective view according to the cooperation mechanism of the above-mentioned preferred embodiment.

Referring now to FIGS. 4 and 6, the rest apparatus 8 for infants with a backrest and headrest cooperation mechanism of the present invention includes an U-type seat frame 1, an U-type backrest 2, and an U-type headrest 3, all of which are pivotally connected together in sequence, and is especially equipped with a cooperation mechanism 4 pivotally connected with the backrest 2 and the headrest 3.

The backrest 2 has a bottom wall 21, a pair of side walls 22 perpendicularly and upwardly extending from both transverse sides of the bottom wall 21, and an accommodation space (not shown) defined by the bottom wall 21 and both the side walls 22 for an infant to lie in. The bottom wall 21 is provided with a longitudinal tunnel 211 open near the seat frame 1 and close near the headrest 3. Each of the side walls 22 has a curved slot 221 near the headrest 3 to allow the cooperation mechanism 4 accommodated or pivotally connected to.

The cooperation mechanism 4 includes a first rod 41, a second rod 42, a third rod 43 and an elastic element 44, all of which are pivotally connected together in sequence. The elastic element 44 is accommodated in the tunnel 211 of the backrest 2 at the close end 212 and the first rod 41 is accommodated in the tunnel 211 of the backrest 2 at the open end 213. The first rod 41 has a first end 411, a second end 412 opposite to the first end 411, a transverse flute 413 near the second end 412 to allow the second rod 42 pivotally connected to, and a stud 414 longitudinally extending from the second end 412 for securing the elastic element 44. The first end 411 of the first rod 41 protrudes out of the open end 213 of the tunnel 211 by the aid of the elastic element 44 exerting a forcing on the second end 412.

The second rod 42 includes a third end 421, a fourth end 422 opposite to the third end 421, a pivot section 423 connecting the third end 421 and the fourth end 422 and at the same time transversely offsetting the both, and a pivot 424 transversely projecting from the third end 421 to be accommodated in the flute 413 of the first rod 41. The second rod 42 is pivotally connected to the side wall 22 of the backrest 2 by a first swivel pin 425, such as a rivet or a bolt, transversely penetrating the pivot section 423.

The third rod 43 includes a fifth end 431 and a sixth end 432 opposite to the fifth end 431. A second swivel 433 pin transversely penetrates the fourth end 422 of the second rod 42, the slot 221 in the backrest 2, and the fifth end 431 of the third rod 43 in sequence so that the second rod 42 and third rod 43 are pivotally connected to the side wall 22 of the backrest 2. Besides, a third swivel pin 434 can pivot the sixth end 432 of the third rod 43 with the headrest 3.

Figure 7:
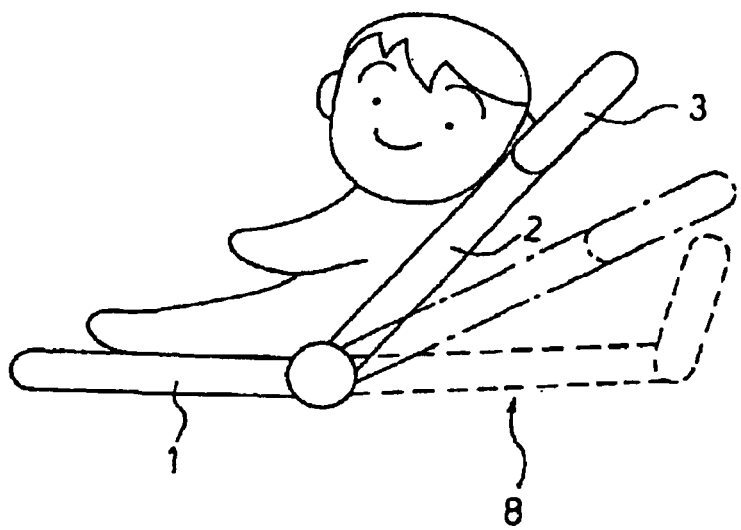
FIG. 7 is a schematic side view showing an infant reclines on the stroller or chair of the above-mentioned preferred embodiment and illustrating, when the backrest is in the reclining position, the headrest does not cooperate with the backrest such that both of them almost align so as to prevent the infant's neck from being bent.
Figure 3:
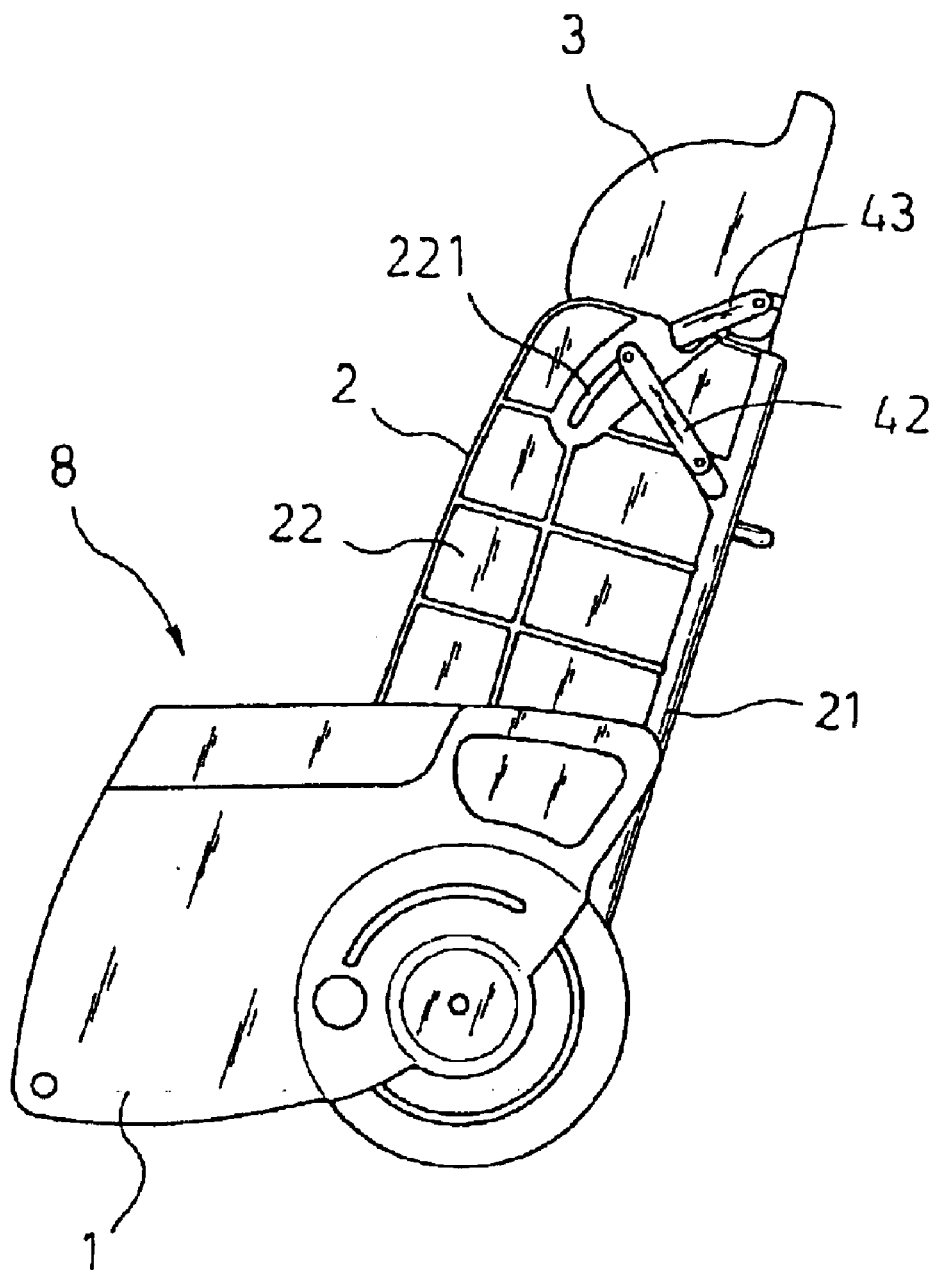
FIG. 3 is an assembled side combination view showing a preferred embodiment according to the rest apparatus for infants with backrest and headrest cooperation mechanism of the present invention and illustrating the backrest in the upright state.

FIG. 3 illustrates the backrest in the upright state for an infant, toddler or small child sitting. At this moment, the angle between the backrest 2 and the seat frame 1 is slightly larger than 90 degrees. FIG. 4 illustrates the backrest in an inclining state for an infant, toddler or small child reclining and the angle between the backrest 2 and the seat frame 1 is between about 100 degrees and 150 degrees. According to the illustrations of FIGS. 3 and 4, when the angle of the backrest 2 relative to seat frame 1 is smaller than 150 degrees, the first end 411 of the first rod 41 does not contact with a shoulder 11 of the seat frame 1. Therefore, the first rod 41 will not move relative to the backrest 2, and will not cooperate with the second rod 42 and third rod 43, neither. Naturally, the angle of the headrest 3 relative to the backrest 2 does not be changed, which keeps the backrest 2 and the headrest 3 aligning at the same plane so as to comply with the infant's back and head profile when it sits or reclines thereon (as the solid line and the chain-dotted line shown in FIG. 7) and prevent its neck from being improperly bent. At the same time, during the states of FIGS. 3 and 4, the infant, toddler or small child must overcomes a large downward gravity and then it can separates itself from the top end of the backrest 2 or headrest 3. However, the infant, toddler or small child does not possess the ability, so there exists no danger of dropping.

Figure 5:
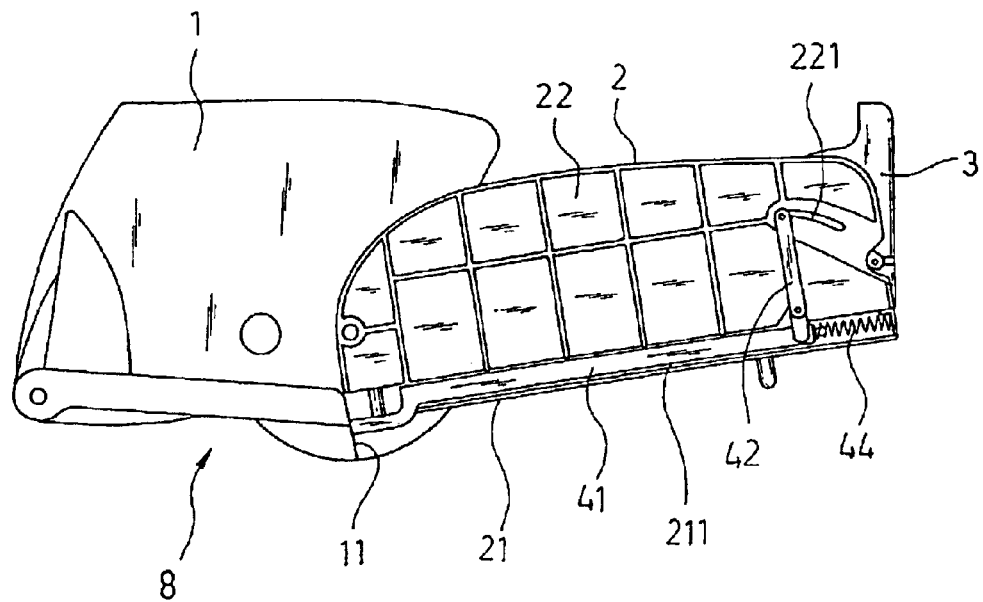
FIG. 5 is an assembled side view of the above-mentioned preferred embodiment illustrating the backrest in the lying state.

FIG. 5 illustrates the backrest in an almost flat state for an infant, toddler or small child lying thereon. At this moment, the angle between the backrest 2 and the seat frame 1 is between about 150 degrees and 180 degrees. When the backrest 2 is rotated and forms an angle about 150 degrees relative the seat frame 1, the first end 411 of the first rod 41 begins to contact with the shoulder 11 and urges the first rod 41 to longitudinally move toward the top end of the backrest 2. At the same time, the second end 412 of the first rod 41 compresses the elastic element 44 and cooperates the second rod 42 to make the third end 421 of the second rod 42 swing counter-clockwise. Because the pivot section 423 of the second rod 42 is pivotally connected to the side wall 22 of the backrest 2 by means of the first swivel pin 425, the fourth end 422 of the second rod 42 will be swung counter clockwise, either, using the pivot section 423 as a pivot center and guided by the slot 221. The fourth end 422 of the second rod 42 simultaneously cooperates the third rod 43 and the headrest 3 is rotated by the sixth end 432 of the third rod 43 to gradually decrease the angle between the headrest 3 and the backrest 2. While the angle between the backrest 2 and the seat frame 1 is gradually increased from 150 degrees or so to 180 degrees, also the angle between the headrest 3 and the backrest 2 is correspondingly and gradually decreased from 180 degrees or so to 90 degrees as the dotted line shown in FIG. 7 such that the apparatus 8 of the invention can prevent the infant, toddler, and small child, lying in the seat frame 1 and the backrest 2, from dropping out of the backrest 2 near the headrest 3 by the obstruction of the headrest 3.

If the backrest 2 is pivotally rotated relative to the seat frame 1 in counter clockwise from the state illustrated as FIG. 5, that is, turning back to FIG. 4 or further back to FIG. 3 from FIG. 5, the first rod 41 will be pushed toward the open end 213 relative to backrest 2 by the restoration force of the elastic element 44. After transmitting the movement through the second rod 42 and the third rod 43 and cooperating the headrest 3, the angle between the headrest 3 and the backrest 2 is gradually increased from 90 degrees to 180 degrees.

Figure 1:
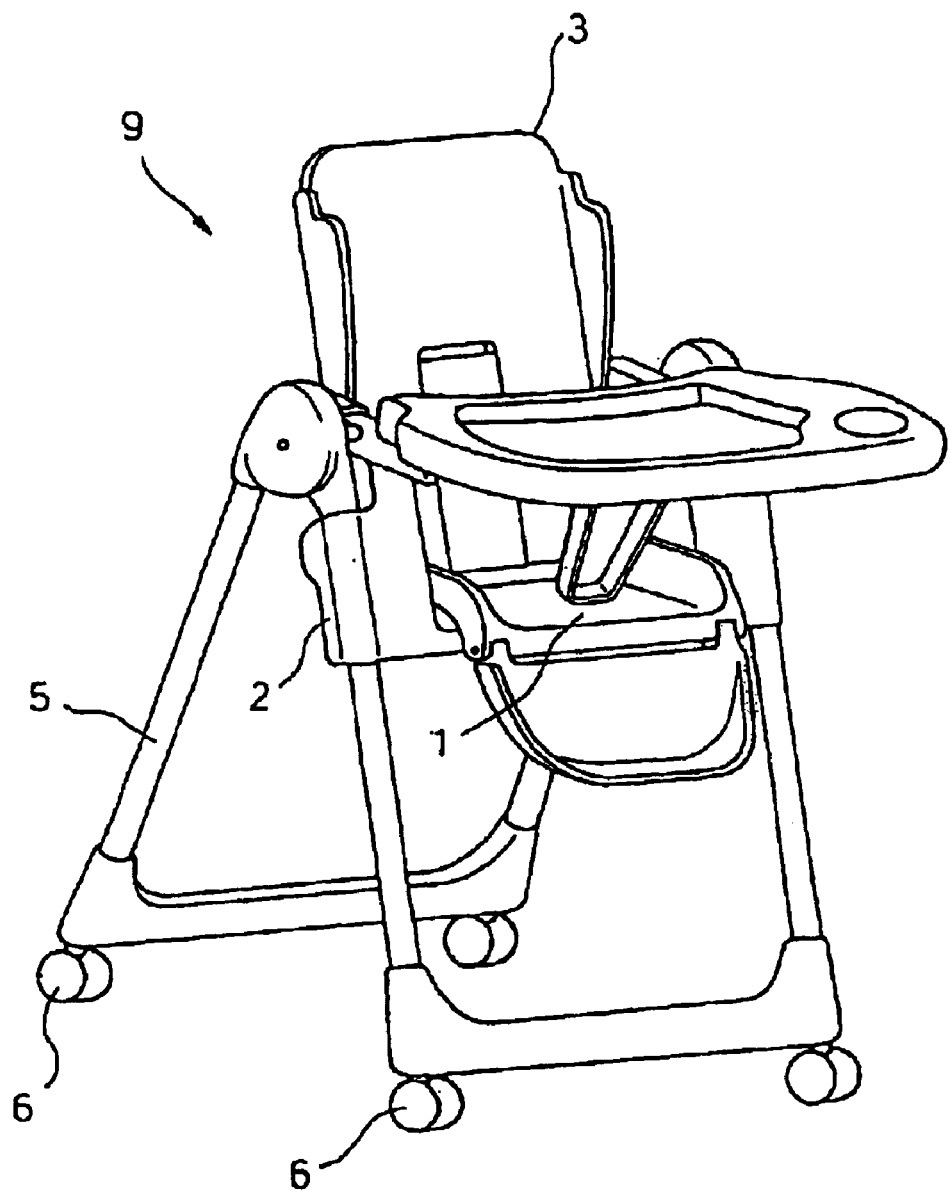
FIG. 1 is a perspective view illustrating a conventional high chair.
Figure 2:
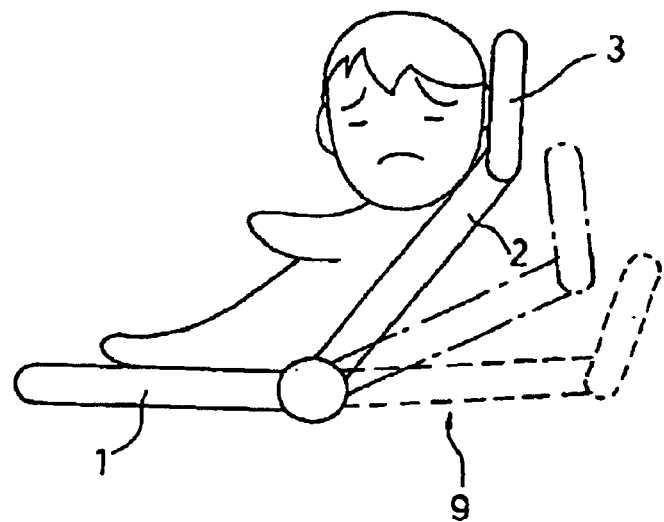
FIG. 2 is a schematic side view showing an infant reclines on a conventional stroller or high chair and illustrating the headrest cooperates with the backrest and changes the angle between both of them so that the infant's neck is improperly bent when the backrest is at the reclining position.

Summing up the above description, the rest apparatus 8 according to the present invention is indeed able to achieve the objects that the headrest 3 is cooperated and the inclination angle of the headrest 3 relative to the backrest is adjusted only when the backrest 2 is at certain positions and the neck of the infant, toddler and small child therein will not be improperly bent by the chair 8 of the invention. Besides, the rest apparatus 8, such as a chair, with a backrest and headrest cooperation mechanism can be advantageously connected to a supporting frame 5 and a plurality of wheels 6 similar to those shown in FIG. 1 so as to form a rest apparatus 8, such as a stroller, having the above-mentioned objects and functions of the chair 8.

This invention has been disclosed in terms of specific embodiments. It will be apparent that many modifications can be made to the disclosed structures without departing from the invention for example increasing the quantity of the cooperation mechanism 4 installed at the bottom wall 21 of the backrest 2 and headrest 3 from one in the whole apparatus 8 to one at each side, vice versa. Therefore, it is the intent of the appended claims to cover all such variations and modifications as come within the true spirit and scope of this invention.

What is claimed is:

1. A rest apparatus for infants with backrest and headrest cooperation mechanism, comprising:

a backrest;

a seat frame pivotally connected to an end of the backrest;

a headrest pivotally connected to another end of the backrest; and a cooperation mechanism, the cooperation mechanism further comprising:

a first rod connecting with the backrest and having a first end and a second end opposite to the first end;

a second rod having a third end, a fourth end opposite to the third end, and a pivot section between the third end and the forth end, wherein the third end is directly pivotally connected with the second end of the first rod and the pivot section is pivotally connected to the backrest; and a third rod having a fifth end directly pivotally connected with the fourth end of the second rod, and a sixth end opposite to the fifth end directly pivotally connected with the headrest;

whereby during the seat frame, the backrest, and the headrest being relatively rotated, if the first rod moves relative to the backrest, the first rod cooperates the second and the third rods, and moreover changes the relative angle between the headrest and the backrest; on the other hand, if the first rod does not move relative to the backrest, the relative angle between the headrest and the backrest will remain unchanged, whereby movement of the first rod is determined by the inclination of the backrest.

2. The rest apparatus for infants with backrest and headrest cooperation mechanism as claimed in claim 1, further comprising an elastic element, an end of which is connected with the second end of the first rod in order to exert a force on the first rod toward the seat frame.

3. The rest apparatus for infants with backrest and headrest cooperation mechanism as claimed in claim 1 or 2, wherein the backrest has a slot for guiding the movement of the fourth end of the second rod.

4. The rest apparatus for infants with backrest and headrest cooperation mechanism as claimed in claim 3, wherein the first rod has a flute near the second end thereof.

5. The rest apparatus for infants with backrest and headrest cooperation mechanism as claimed in claim 1, wherein the seat frame has a shoulder, and if the first end of the first rod does not contact the shoulder, the first rod does not cooperate the second and the third rods, and the relative angle between the headrest and the backrest will remain unchanged; on the other hand, if the first end of the first rod contacts the shoulder, the headrest and the backrest are cooperated and the relative angle is changed.

6. The rest apparatus for infants with backrest and headrest cooperation mechanism as claimed in claim 1, wherein the backrest has the cooperation mechanism at each of two sides.

* * * * *

UNITED STATES PATENT AND TRADEMARK OFFICE
CERTIFICATE OF CORRECTION

PATENT NO.        : 6,896,326 B2                                           Page 1 of 1
APPLICATION NO. : 10/422159
DATED             : May 24, 2005
INVENTOR(S)       : Shun-Min Chen It is certified that error appears in the above-identified patent and that said Letters Patent is hereby corrected as shown below:

On the title page, item:

(73) Assignee: Wonderland Nursery Goods Co., Ltd. (TW)

Signed and Sealed this

Nineteenth Day of September, 2006

JON W. DUDAS
*Director of the United States Patent and Trademark Office*

UNITED STATES PATENT AND TRADEMARK OFFICE
CERTIFICATE OF CORRECTION

PATENT NO. : 6,896,326 B2
APPLICATION NO. : 10/422159
DATED : May 24, 2005
INVENTOR(S) : Shun-Min Chen It is certified that error appears in the above-identified patent and that said Letters Patent is hereby corrected as shown below:

On the title page, item:

(73) Assignee: Wonderland Nursery goods Co., Ltd. (TW)

This certificate supersedes the Certificate of Correction issued September 19, 2006.

Signed and Sealed this

Fourth Day of March, 2008

JON W. DUDAS
*Director of the United States Patent and Trademark Office*